United States Patent
Haag et al.

(10) Patent No.: US 10,615,991 B2
(45) Date of Patent: Apr. 7, 2020

(54) PROVIDING HYBRID NETWORK CONNECTIVITY TO AT LEAST ONE CLIENT DEVICE BEING CONNECTED TO A TELECOMMUNICATIONS NETWORK USING A CUSTOMER PREMISES EQUIPMENT DEVICE OR FUNCTIONALITY

(71) Applicant: Deutsche Telekom AG, Bonn (DE)

(72) Inventors: Thomas Haag, Rodgau (DE); Hans-Joerg Kolbe, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 128 days.

(21) Appl. No.: 15/710,853

(22) Filed: Sep. 21, 2017

(65) Prior Publication Data

US 2018/0091323 A1    Mar. 29, 2018

(30) Foreign Application Priority Data

Sep. 23, 2016   (EP) .................................... 16190319

(51) Int. Cl.
*H04L 12/12* (2006.01)
*H04L 12/28* (2006.01)
(Continued)

(52) U.S. Cl.
CPC .......... *H04L 12/12* (2013.01); *H04L 12/2863* (2013.01); *H04L 12/5691* (2013.01); *H04L 45/24* (2013.01); *H04L 47/125* (2013.01)

(58) Field of Classification Search
CPC . H04L 12/12; H04L 12/5691; H04L 12/2863; H04L 45/24; H04L 47/125
See application file for complete search history.

(56) References Cited

U.S. PATENT DOCUMENTS

2006/0258356 A1\* 11/2006 Maxwell ........... H04L 29/12047
455/436
2014/0112139 A1\* 4/2014 Allan .................... H04L 47/125
370/235
(Continued)

FOREIGN PATENT DOCUMENTS

EP        2375797 A1    10/2011

OTHER PUBLICATIONS

Bonaventure Uclouvain C Paasch Apple O et al: "Use Cases and Operational Experience with Multipath TCP; draft-ietf-mptcp-experience-06.txt", Use Cases and Operational Experience With Multipath TCP; Draft—IETF—MPTCP—Experience With Multipath TCP; draft-ietf-mptcp-experience-06.txt, Internet Engineering Task Force, IETF; Standardworkingdraft, Internet Society (ISOC) 4, Rue Des Falaises CH—1205 Geneva, Switzerland, Aug. 29 2016 (Aug. 29, 2016), pp. 1-35, XP015115057.

*Primary Examiner* — Ian N Moore
*Assistant Examiner* — Justin T Van Roie
(74) *Attorney, Agent, or Firm* — Leydig, Voit & Mayer, Ltd.

(57) ABSTRACT

A method for providing hybrid network connectivity to at least one client device being connected to a telecommunications network using a customer premises equipment device or functionality includes the following steps: in a first step, a primary connection path is established between a first internet protocol edge device and the customer premises equipment device or functionality, the establishment of the primary connection path involving assignment of an internet protocol address to the hybrid internet protocol connection to be generated; and in a second step, subsequent to the first step, at least one secondary connection path is established between a second internet protocol edge device and the customer premises equipment device or functionality, the at (Continued)

50 customer premises equipment device
51 client device
52 client device
100 telecommunications network
110 logical or physical central office point of delivery
150 base station entity
190 network functionalities least one secondary connection path using the same internet protocol address as the primary connection path.

12 Claims, 4 Drawing Sheets

(51) Int. Cl.
  *H04L 12/54* (2013.01)
  *H04L 12/707* (2013.01)
  *H04L 12/803* (2013.01)

(56) References Cited

U.S. PATENT DOCUMENTS

2014/0355536 A1  12/2014  Muley et al.
2015/0295728 A1  10/2015  Kadel et al.

\* cited by examiner

Fig. 1

50 customer premises equipment device
51 client device
52 client device
100 telecommunications network
110 logical or physical central office point of delivery
150 base station entity
190 network functionalities

Fig. 2

110 logical or physical central office point of delivery
111 network function
112 network function
113 network function
114 network function
115 network function
121 access port
122 access port
123 access port
124 access port
125 access port

Fig. 3

50 customer premises equipment device
110 logical or physical central office point of delivery
111 first virtual network function
112 second virtual network function
119 database functionality
210 primary connection path
220 secondary connection path

111 first internet protocol edge device
112 second internet protocol edge device
125 wide area network port
126 load balancing functionality
210 primary connection path
220 secondary connection path

PROVIDING HYBRID NETWORK CONNECTIVITY TO AT LEAST ONE CLIENT DEVICE BEING CONNECTED TO A TELECOMMUNICATIONS NETWORK USING A CUSTOMER PREMISES EQUIPMENT DEVICE OR FUNCTIONALITY

CROSS-REFERENCE TO RELATED APPLICATIONS

Priority is claimed to European Patent Application No. EP 16 190 319.0, filed on Sep. 23, 2016, the entire disclosure of which is hereby incorporated by reference herein.

FIELD

The present invention relates a method for providing hybrid network connectivity to at least one client device being connected to a telecommunications network using a customer premises equipment device or functionality, wherein the network connectivity is provided using a hybrid internet protocol connection between at least two internet protocol edge devices, on the one hand, and the customer premises equipment device or functionality, on the other hand, allowing for the transmission of data packets, both in uplink direction from the customer premises equipment device or functionality to at least one of the internet protocol edge devices, and in downlink direction from at least one of the internet protocol edge devices to the customer premises equipment device or functionality.

Furthermore, the present invention relates to a telecommunications network for providing hybrid network connectivity to at least one client device being connected to the telecommunications network using a customer premises equipment device or functionality, wherein the network connectivity is provided using a hybrid internet protocol connection between at least two internet protocol edge devices, on the one hand, and the customer premises equipment device or functionality, on the other hand, allowing for the transmission of data packets, both in uplink direction from the customer premises equipment device or functionality to at least one of the internet protocol edge devices, and in downlink direction from at least one of the internet protocol edge devices to the customer premises equipment device or functionality.

Additionally, the present invention relates to a logical or physical central office point of delivery for providing hybrid network connectivity to at least one client device being connected to a telecommunications network using a customer premises equipment device or functionality, wherein the network connectivity is provided using a hybrid internet protocol connection between at least two internet protocol edge devices, on the one hand, and the customer premises equipment device or functionality, on the other hand, allowing for the transmission of data packets, both in uplink direction from the customer premises equipment device or functionality to at least one of the internet protocol edge devices, and in downlink direction from at least one of the internet protocol edge devices to the customer premises equipment device or functionality.

Additionally, the present invention relates to a system for providing hybrid network connectivity to at least one client device being connected to a telecommunications network using a customer premises equipment device or functionality, wherein the system comprises the telecommunications network, a logical or physical central office point of delivery, and the customer premises equipment device or functionality, wherein the network connectivity is provided using a hybrid internet protocol connection between at least two internet protocol edge devices, on the one hand, and the customer premises equipment device or functionality, on the other hand, allowing for the transmission of data packets, both in uplink direction from the customer premises equipment device or functionality to at least one of the internet protocol edge devices, and in downlink direction from at least one of the internet protocol edge devices to the customer premises equipment device or functionality.

Furthermore, the present invention relates to a program and a computer program product for providing hybrid network connectivity to at least one client device being connected to a telecommunications network using a customer premises equipment device or functionality.

The present invention generally relates to the area of providing network access to client devices being connected to a telecommunications network.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

Typically, such client devices use a network connectivity link provided by a customer premises equipment device that connects the client device to a telecommunications network. Such network connectivity to a telecommunications network is typically required in order to provide internet-based services and applications to the client devices to fulfill people's needs in areas such as communication, banking, shopping, information, education and entertainment. Hence, high performance internet access solutions are an important prerequisite. Currently, in most cases, residential customers use wireline technologies (such as digital subscriber line (DSL) or Data Over Cable Service Interface Specification (DOCSIS)) for Internet access, whereas mobile customers use cellular technologies (such as Global System for Mobile Communications (GSM), Universal Mobile Telecommunications Service (UMTS) or Long-Term Evolution (LTE)).

Telecommunications service providers continuously seek to provide ever more bandwidth in access networks in order to cater for enhanced bandwidth (or bit rate) needs (or needs regarding other quality-of-service parameters, such as low latency, low bit error probability, etc.) of their customers. This led to the development of multiple technologies for grouping local links (e.g. ATM IMA (Asynchronous Transfer Mode Inverse Multiplexing for ATM) or Ethernet LAG (Link Aggregation)) as well as for providing link bundling/aggregation across multiple network domains by enabling such bundling on higher network layers (e.g. multilink PPP (Point to Point Protocol). As the internet protocol is considered to be or to become the common protocol layer upon which communication services are provided, approaches exist for providing internet protocol connectivity access over multiple access links, i.e. providing such a bundling of different access links on the internet protocol layer. Hybrid access schemes (e.g. developed in the Broadband Forum) are an example thereof, where an access line in the fixed line domain is bundled together with a radio link in order to provide more aggregate bandwidth or a higher overall bit rate. The resulting bundled link provides the internet protocol connectivity.

However, the implementation of known hybrid access schemes is comparatively complex and involves a lot of redundancy regarding different functions, such as, e.g., the use of a plurality of internet protocol addresses as well as typically three internet protocol edge functions (for instance and in case of a hybrid access scheme bundling a DSL (digital subscriber line) or fixed line internet protocol access with a mobile (LTE, Long Term Evolution) access, internet protocol edge functionality is provided by the packet gateway (P-GW), the broadband network gateway (BNG), as well as by the hybrid access gateway (HAG)).

SUMMARY

In an exemplary embodiment, the present invention provides a method for providing hybrid network connectivity to at least one client device being connected to a telecommunications network using a customer premises equipment device or functionality. The network connectivity is provided using a hybrid internet protocol connection between at least two internet protocol edge devices, on the one hand, and the customer premises equipment device or functionality, on the other hand, allowing for transmission of data packets, both in uplink direction from the customer premises equipment device or functionality to at least one of the internet protocol edge devices, and in downlink direction from at least one of the internet protocol edge devices to the customer premises equipment device or functionality. Both a first internet protocol edge device and a second internet protocol edge device are realized as network functions within a logical or physical central office point of delivery. The hybrid internet protocol connection comprises a primary connection path and at least one secondary connection path. The method includes the following steps: in a first step, the primary connection path is established between the first internet protocol edge device and the customer premises equipment device or functionality, the establishment of the primary connection path involving assignment of an internet protocol address to the hybrid internet protocol connection to be generated; and in a second step, subsequent to the first step, the at least one secondary connection path is established between the second internet protocol edge device and the customer premises equipment device or functionality, the at least one secondary connection path using the same internet protocol address as the primary connection path. Regarding data packets transmitted in downlink direction towards the customer premises equipment device or functionality, a load balancing functionality is used as a network function within the logical or physical central office point of delivery or as part of another network function within the logical or physical central office point of delivery; and/or during or after establishing the primary connection path, path establishment information is transmitted, using the primary connection path, from the first internet protocol edge device to the customer premises equipment device, wherein the path establishment information is used to establish the at least one secondary connection path.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide a technically simple, effective and cost effective solution for providing hybrid network connectivity to at least one client device being connected to a telecommunications network, typically using a customer premises equipment device or functionality. Exemplary embodiments of the present invention further provide a corresponding telecommunications network, a corresponding user equipment, and a corresponding system comprising a telecommunications network, and the logical or physical central office point of delivery.

In an exemplary embodiment, the present invention provides a method for providing hybrid network connectivity to at least one client device being connected to a telecommunications network using a customer premises equipment device or functionality, wherein the network connectivity is provided using a hybrid internet protocol connection between at least two internet protocol edge devices, on the one hand, and the customer premises equipment device or functionality, on the other hand, allowing for the transmission of data packets, both in uplink direction from the customer premises equipment device or functionality to at least one of the internet protocol edge devices, and in downlink direction from at least one of the internet protocol edge devices to the customer premises equipment device or functionality, wherein both the first internet protocol edge device and the second internet protocol edge device are realized as network functions within a logical or physical central office point of delivery, the hybrid internet protocol connection comprising a primary connection path and at least one secondary connection path, wherein the method comprises the following steps:

in a first step, the primary connection path is established between the first internet protocol edge device and the customer premises equipment device or functionality, the establishment of the primary connection path involving the assignment of an internet protocol address to the hybrid internet protocol connection to be generated, in a second step, subsequent to the first step, the at least one secondary connection path is established between the second internet protocol edge device and the customer premises equipment device or functionality, the at least one secondary connection path using the same internet protocol address as the primary connection path, wherein—regarding data packets transmitted in downlink direction towards the customer premises equipment device or functionality—a load balancing functionality is used as a network function within the logical or physical central office point of delivery or as part of another network function within the logical or physical central office point of delivery, and/or wherein, during or after establishing the primary connection path, a path establishment information is transmitted, using the primary connection path, from the first internet protocol edge device to the customer premises equipment device, wherein the path establishment information is used to establish the at least one secondary connection path.

It is thereby advantageously possible according to the present invention that function redundancy as well as complexity in realizing a hybrid access scheme can be avoided, and, hence, a more simple and robust hybrid access solution provided.

According to the present invention, hybrid network connectivity is provided to at least one client device that is connected to a telecommunications network. The client device can be any communication device such as a personal portable or desktop computing device, a (video or audio) streaming device, a television device, a smart phone, a tablet computing device, or any other device that is connectable either using a wireline or cable connection, or by using a wireless link such as a WLAN (wireless local area network) or WiFi connection, a Bluetooth connection or any other low range or cellular wireless access technology. In case that the hybrid network connectivity involves using a fixed line internet protocol access to the telecommunications network (such as a digital subscriber line or fixed line access using an optical communication network), a customer premises equipment device is typically used, i.e. a hardware device, providing the connectivity towards the telecommunications network, which the client device or plurality of client devices is or are locally connected to. Especially in case of the client device providing the functionality of being connected to the telecommunications network via a wireless access technology, the functionality of the customer premises equipment device (of providing network connectivity to the telecommunications network) can also be implemented in the client device itself; however, also in this case, the customer premises equipment functionality needs to be provided, even though, in this case, no dedicated hardware device or "box" is used but rather a hardware and/or software module within the client device.

According to the present invention, the network connectivity is provided using a hybrid internet protocol connection between at least two internet protocol edge devices, on the one hand, and the customer premises equipment device (or the customer premises equipment functionality in case it is realized within the client device), on the other hand. This allows for the transmission of data packets, both in uplink direction from the customer premises equipment device (or customer premises equipment functionality) to at least one of the internet protocol edge devices, and in downlink direction from at least one of the internet protocol edge devices to the customer premises equipment device (or customer premises equipment functionality). Hence, the hybrid internet protocol connection comprises a primary connection path (between one of the internet protocol edge devices and the customer premises equipment device or functionality) and at least one secondary connection path (between the other of the internet protocol edge devices and the customer premises equipment or functionality). The hybrid access or the hybrid internet protocol connection according to the present invention may include more than one access path and it may use multiple diverse access technologies (such as, e.g. a fixed line access such as a digital subscriber line, and a mobile or wireless access such as an LTE access) but can also use the same access technologies, i.e. the primary path and the secondary path may use the same access technology (such as, e.g., two (or more) different wireless LTE accesses, or two (or more) digital subscriber lines).

According to the present invention, both the first internet protocol edge device and the second internet protocol edge device are realized as network functions within a logical or physical central office point of delivery. This means that the first and second internet protocol edge devices are advantageously co-located in a data center (or logical or physical central office point of delivery) to optimize packet paths; in case of a fixed line access being bundled with a wireless (cellular) access technology, this typically means that the broadband network gateway (BNG) (or first internet protocol edge device) and the packet gateway (P-GW) (or second internet protocol edge device) are co-located in the same data center. Especially thereby, it is advantageously possible to remove and/or offload redundant functionality provided for in conventional hybrid access connectivity schemes, as well as to reduce the amount of internet protocol addresses used for such hybrid connections.

According to the method of the present invention, in a first step, the primary connection path is established between the first internet protocol edge device and the customer premises equipment device (or customer premises equipment functionality), the establishment of the primary connection path involving the assignment of an internet protocol address to the hybrid internet protocol connection to be generated. In a second step, subsequent to the first step, the at least one secondary connection path is established between the second internet protocol edge device and the customer premises equipment device or functionality, wherein the at least one secondary connection path is using—at least in essence—the same internet protocol address as the primary connection path. The wording "at least in essence the same internet protocol address" is to be understood that, in case that the internet protocol address used for both the primary connection path and the at least one secondary connection path corresponds to an IPv4 internet protocol address, the internet protocol address used is identical for both paths. In case, however, that the internet protocol address used for both the primary connection path and the at least one secondary connection path corresponds to an IPv6 internet protocol address, it is—according to a first alternative embodiment of the present invention—also possible and preferred to use the identical (or the same) internet protocol address, however, it is—according to a second alternative embodiment of the present invention—also possible and preferred to use two different internet protocol addresses that are very similar.

According to the present invention and at least regarding data packets transmitted in downlink direction towards the customer premises equipment device (or customer premises equipment functionality), a load balancing functionality is used as a network function within the logical or physical central office point of delivery or as part of another network function within the logical or physical central office point of delivery. Cumulatively or alternatively (to using a load balancing functionality), during or after establishing the primary connection path, a path establishment information is transmitted, using the primary connection path, from the first internet protocol edge device to the customer premises equipment device, wherein the path establishment information is used to establish the at least one secondary connection path.

According to the present invention, it is advantageously possible to address the following issues: enabling the use of the same internet protocol address to the customer; routing traffic in an optimized way, providing a central gateway for traffic from the wide area network; and providing smart load balancing mechanisms to enable efficient use of the resources.

Via providing—within the logical or physical central office point of delivery—a single gateway that bundles traffic from all involved access links, it is advantageously possible to have (or use) the same internet protocol address for the hybrid access link as a whole, i.e. for each component or connection path.

Furthermore, it is advantageously possible according to the present invention to apply an auto-provisioning of additional (connection) paths based on the primary connection path (or created session), or based on any other connection path. Thereby, it is, e.g., advantageously possible to establish—according to the first and second step of an exemplary embodiment of the inventive method—the primary connection path, and, via transmitting the path establishment information using the primary connection path, as well the secondary connection path. In such a situation, either an additional connection path (such a tertiary or a further second connection path) might be established (likewise via transmitting (further) path establishment information, either by using the primary connection path, or the secondary connection path, or both), resulting in the hybrid internet protocol connection comprising three connections paths, or one of the primary or secondary connection paths might be removed (such as user and/or network triggered, or caused by a failure or a timeout event), resulting in only having one connection path activated; in case that the (previously) primary connection path is removed, the (previously) secondary connection path is considered to be the "new" primary connection path, i.e. in case of establishing a "new" secondary connections path, this previously secondary connection path acts as or is used as the primary connection path according to the first and second step of the method according to the present invention.

The telecommunications network according to the present invention might be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

According to a preferred embodiment of the present invention, the at least one secondary connection path is established between the customer premises equipment device (or customer premises equipment functionality) and the second internet protocol edge device, using the path establishment information, especially in order to find the second internet protocol edge device, wherein the path establishment information especially comprises at least one out of a user credential information, a session token, an access point name information, and an access point name instance information, especially in order to allow for an implicit authentication information of the customer premises equipment device or functionality.

Thereby, it is advantageously possible that to realize the auto-provisioning functionality according to the present invention. Furthermore, it is to be understood that more than two connection paths are able to be realized according to the present invention.

According to further embodiments of the present invention, the primary connection path is a fixed line access connection and the first internet protocol edge device is a broadband network gateway, and wherein the at least one secondary connection path is a mobile access connection and the second internet protocol edge device is a packet gateway, or the primary connection path is a mobile access connection and the first internet protocol edge device is a packet gateway, and wherein the at least one secondary connection path is a fixed line access connection and the second internet protocol edge device is a broadband network gateway, or the primary connection path is a mobile access connection and the first internet protocol edge device is a packet gateway, and wherein the at least one secondary connection path is a mobile access connection and the second internet protocol edge device is a further packet gateway, or the primary connection path is a fixed line access connection and the first internet protocol edge device is a broadband network gateway, and wherein the at least one secondary connection path is a fixed line access connection and the second internet protocol edge device is a broadband network gateway.

Thereby, it is advantageously possible that any combination of access technologies or methods of the primary and secondary connections paths are able to be realized.

Furthermore, according to an embodiment of the present invention, the internet protocol address, used by the customer premises equipment device or functionality with regard to both the primary connection path and the at least one secondary connection path, is validated at the internet protocol edge device or devices serving all connection paths beyond the primary connection path, using at least one out of the following:

a database request using a token information towards an internet protocol address database, using a push request from the first internet protocol edge device, a token or other additional parameter included in the tunnel setup messages.

Thereby, it is advantageously possible to easily and effectively implement an exemplary embodiment of the inventive method.

According to a further embodiment of the present invention, —regarding data packets transmitted in uplink direction towards the customer premises equipment device or functionality—a further load balancing functionality is implemented in the customer premises equipment device (or customer premises equipment functionality).

According to still a further embodiment of the present invention, the load balancing functionality, the first internet protocol edge device, and the second internet protocol edge device are realized as separate network functions within the logical or physical central office point of delivery.

Additionally, according to a further embodiment of the present invention the first internet protocol edge device and the second internet protocol edge device are realized as separate network functions within the logical or physical central office point of delivery, and wherein the load balancing functionality is realized as part of the network function of either the first or the second internet protocol edge device.

Via these different embodiments of the present invention, a flexible and effective implementation of the invention is advantageously possible.

Additionally, a further embodiment of the present invention relates to the load balancing functionality being realized via using—in addition to using the internet protocol address, or part thereof, used for the primary connection path and for the at least one secondary connection path—the layer 4 port information indicating to use the primary connection path or a secondary connection path, wherein the port information is set by the customer premises equipment device or functionality during Layer 4 session setup via re-writing the according source port header fields, enabling the load balancer function for packets towards the IP edge functions to route packets towards the respective IP edges based on simple pre-configured rules by looking up the destination port information, wherein especially the load balancer function is realized by configuring flow rules in the switching network elements that connect the IP edge functions with the network, effectively implementing load balancing based on layer 4 port ranges inside the switching network or by configuring such flow rules in a dedicated load balancer function.

According to a further embodiment of the present invention, the first internet protocol edge device, the second internet protocol edge device, and the load balancing functionality are realized in one integrated network function within the logical or physical central office point of delivery.

Furthermore, the present invention relates to a telecommunications network for providing hybrid network connectivity to at least one client device being connected to the telecommunications network using a customer premises equipment device or functionality, wherein the network connectivity is provided using a hybrid internet protocol connection between at least two internet protocol edge devices, on the one hand, and the customer premises equipment device or functionality, on the other hand, allowing for the transmission of data packets, both in uplink direction from the customer premises equipment device or functionality to at least one of the internet protocol edge devices, and in downlink direction from at least one of the internet protocol edge devices to the customer premises equipment device or functionality,
wherein both the first internet protocol edge device and the second internet protocol edge device are realized as network functions within a logical or physical central office point of delivery,
the hybrid internet protocol connection comprising a primary connection path and at least one secondary connection path, wherein the telecommunications network is configured such that:
    the primary connection path is established between the first internet protocol edge device and the customer premises equipment device or functionality, the establishment of the primary connection path involving the assignment of an internet protocol address to the hybrid internet protocol connection to be generated,
    the at least one secondary connection path is established between the second internet protocol edge device and the customer premises equipment device or functionality, the at least one secondary connection path using the same internet protocol address as the first connection path,
wherein—regarding data packets transmitted in downlink direction towards the customer premises equipment device or functionality—a load balancing functionality realized as a network function within the logical or physical central office point of delivery or as part of another network function within the logical or physical central office point of delivery, and/or wherein, during or after establishing the primary connection path, a path establishment information is transmitted, using the primary connection path, from the first internet protocol edge device to the customer premises equipment device, wherein the path establishment information is used to establish the at least one secondary connection path.

Furthermore, the present invention relates to a logical or physical central office point of delivery for providing hybrid network connectivity to at least one client device being connected to a telecommunications network using a customer premises equipment device or functionality, wherein the network connectivity is provided using a hybrid internet protocol connection between at least two internet protocol edge devices, on the one hand, and the customer premises equipment device or functionality, on the other hand, allowing for the transmission of data packets, both in uplink direction from the customer premises equipment device or functionality to at least one of the internet protocol edge devices, and in downlink direction from at least one of the internet protocol edge devices to the customer premises equipment device or functionality,
wherein both the first internet protocol edge device and the second internet protocol edge device are realized as network functions within the logical or physical central office point of delivery,
the hybrid internet protocol connection comprising a primary connection path and at least one secondary connection path, wherein the logical or physical central office point of delivery is configured such that:
    the primary connection path is established between the first internet protocol edge device and the customer premises equipment device or functionality, the establishment of the primary connection path involving the assignment of an internet protocol address to the hybrid internet protocol connection to be generated,
    the at least one secondary connection path is established between the second internet protocol edge device and the customer premises equipment device or functionality, the at least one secondary connection path using the same internet protocol address as the first connection path,
wherein—regarding data packets transmitted in downlink direction towards the customer premises equipment device or functionality—a load balancing functionality realized as a network function within the logical or physical central office point of delivery or as part of another network function within the logical or physical central office point of delivery, and/or wherein, during or after establishing the primary connection path, a path establishment information is transmitted, using the primary connection path, from the first internet protocol edge device to the customer premises equipment device, wherein the path establishment information is used to establish the at least one secondary connection path.

Additionally, the present invention relates to a system for providing hybrid network connectivity to at least one client device being connected to a telecommunications network using a customer premises equipment device or functionality, wherein the system comprises the telecommunications network, a logical or physical central office point of delivery, and the customer premises equipment device or functionality, wherein the network connectivity is provided using a hybrid internet protocol connection between at least two internet protocol edge devices, on the one hand, and the customer premises equipment device or functionality, on the other hand, allowing for the transmission of data packets, both in uplink direction from the customer premises equipment device or functionality to at least one of the internet protocol edge devices, and in downlink direction from at least one of the internet protocol edge devices to the customer premises equipment device or functionality, wherein both the first internet protocol edge device and the second internet protocol edge device are realized as network functions within the logical or physical central office point of delivery, the hybrid internet protocol connection comprising a primary connection path and at least one secondary connection path, wherein the system is configured such that:

the primary connection path is established between the first internet protocol edge device and the customer premises equipment device or functionality, the establishment of the primary connection path involving the assignment of an internet protocol address to the hybrid internet protocol connection to be generated, the at least one secondary connection path is established between the second internet protocol edge device and the customer premises equipment device or functionality, the at least one secondary connection path using the same internet protocol address as the first connection path, wherein—regarding data packets transmitted in downlink direction towards the customer premises equipment device or functionality—a load balancing functionality realized as a network function within the logical or physical central office point of delivery or as part of another network function within the logical or physical central office point of delivery, and/or wherein, during or after establishing the primary connection path, a path establishment information is transmitted, using the primary connection path, from the first internet protocol edge device to the customer premises equipment device, wherein the path establishment information is used to establish the at least one secondary connection path.

Still additionally, the present invention relates to a program comprising a computer readable program code which, when executed on a computer and/or on a logical or physical central office point of delivery and/or on an internet protocol edge device being a network function within a logical or physical central office point of delivery or on a load balancing functionality as a network function or part of a network function within a logical or physical central office point of delivery, or in part on a logical or physical central office point of delivery and/or in part on an internet protocol edge device being a network function within a logical or physical central office point of delivery and/or in part on a load balancing functionality as a network function or part of a network function within a logical or physical central office point of delivery, causes the computer and/or the logical or physical central office point of delivery and/or the internet protocol edge device being a network function within a logical or physical central office point of delivery and/or the load balancing functionality as a network function or part of a network function within a logical or physical central office point of delivery to perform an exemplary embodiment of the inventive method.

Furthermore, the present invention relates to a computer program product for providing hybrid network connectivity to at least one client device being connected to a telecommunications network using a customer premises equipment device or functionality, the computer program product comprising a computer program stored on a storage medium, the computer program comprising program code which, when executed on a computer and/or on a logical or physical central office point of delivery and/or on an internet protocol edge device being a network function within a logical or physical central office point of delivery or on a load balancing functionality as a network function or part of a network function within a logical or physical central office point of delivery, or in part on a logical or physical central office point of delivery and/or in part on an internet protocol edge device being a network function within a logical or physical central office point of delivery and/or in part on a load balancing functionality as a network function or part of a network function within a logical or physical central office point of delivery, causes the computer and/or the logical or physical central office point of delivery and/or the internet protocol edge device being a network function within a logical or physical central office point of delivery and/or the load balancing functionality as a network function or part of a network function within a logical or physical central office point of delivery to perform an exemplary embodiment of the inventive method.

According to a further embodiment of the present invention, —regarding data packets transmitted in uplink direction from the customer premises equipment device or functionality—a further load balancing functionality is implemented in the customer premises equipment device (or customer premises equipment functionality).

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
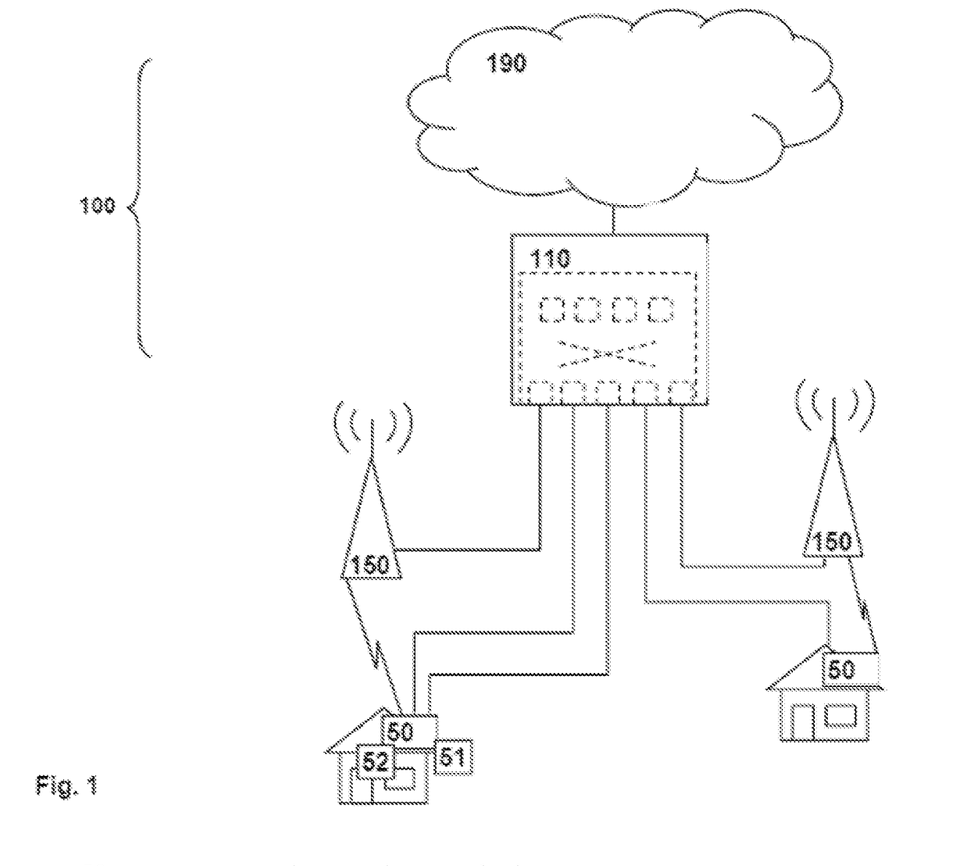
FIG. 1 schematically illustrates a telecommunications network according to the present invention, having a fixed line part and a mobile (or cellular) part, and, hence, providing the possibility for user equipments or client devices to use different access technologies, wherein a logical or physical central office point of delivery is handling different access possibilities.

In FIG. 1, a telecommunications network 100 according to the present invention is schematically shown, having a fixed line part and a mobile (or cellular) part (schematically illustrated via base station entities 150), and, hence, providing the possibility for user equipments or client devices 51, 52 to use different access technologies. The telecommunications network 100 comprises at least one logical or physical central office point of delivery 110 that is preferably realized within a data center and that is handling different access possibilities of the client devices 51, 52 to network functionalities 190 provided by the telecommunications network 100 or via the telecommunications network 100. The client devices 51, 52 are connected to the logical or physical central office point of delivery 110 via a customer premises equipment device 50 or via a customer premises equipment functionality that might be built in the client devices 51, 52.

Figure 2:
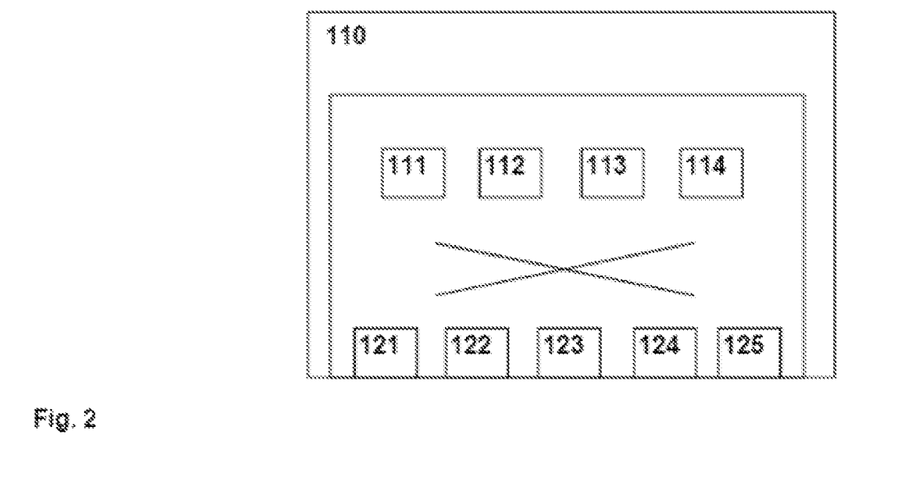
FIG. 2 schematically illustrates a logical or physical central office point of delivery.

FIG. 2 schematically illustrates a logical or physical central office point of delivery 110, especially comprising a plurality of access ports 121, 122, 123, 124, 125. Typically, these access ports 121, 122, 123, 124, 125 are provided to connect the logical or physical central office point of delivery 110 to customer access lines. However, one or a plurality of these access ports 121, 122, 123, 124, 125 can also be provided to connect the logical or physical central office point of delivery 110 to the backbone network or the wide area network. Furthermore, the logical or physical central office point of delivery 110 comprises network functions 111, 112, 113, 114, especially realized as virtual network functions (also called VNF). Such network functions or virtual network functions 111, 112, 113, 114, e.g., realize internet protocol edge devices or internet protocol edge device functionalities such as packet gateway (P-GW) functionalities and/or broadband network gateway (BNG) functionalities.

Figure 3:
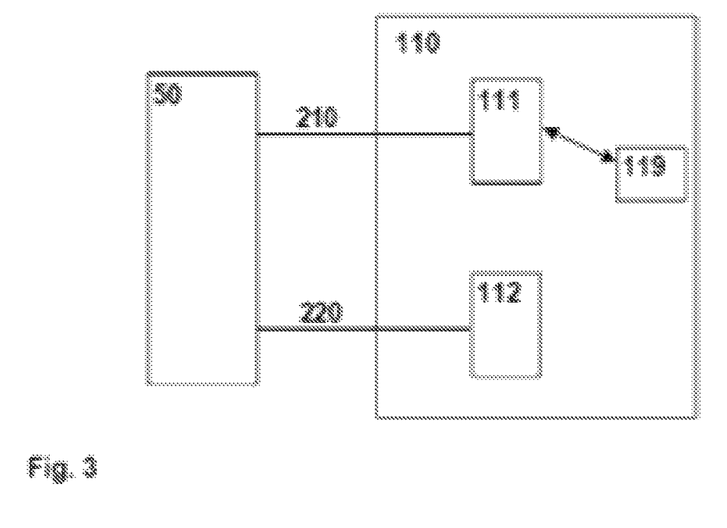
FIG. 3 schematically illustrates a primary connection path and a secondary connection path (as examples for a plurality of possible connection paths—especially also more than two) of a user or a customer premises equipment device (or customer premises equipment functionality) using a hybrid internet protocol connection according to the present invention.

FIG. 3 schematically illustrates
- a primary connection path 210 between a first virtual network function 111, realizing a first internet protocol edge device, and the customer premises equipment device 50 (or customer premises equipment functionality within the client device), and
- a secondary connection path 220 between a second virtual network function 112 realizing a second internet protocol edge device, and likewise the customer premises equipment device 50 (or customer premises equipment functionality within the client device).

The primary and secondary connection paths 210, 220 are examples for a plurality of possible connection paths—especially also more than two—of the user or the customer premises equipment device 50 (or customer premises equipment functionality) using a hybrid internet protocol connection according to the present invention. A database functionality 119 is used to establish the primary connection path 210, wherein the secondary connection path 220 is established by transmitting path establishment information using the primary connection path 210.

Figure 4:
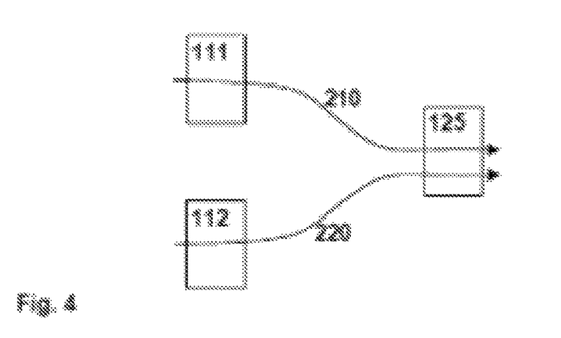
FIG. 4 schematically shows the primary and secondary connection paths in uplink direction.

FIG. 4 schematically shows the primary and secondary connection paths 210, 220 in uplink direction: Within the logical or physical central office point of delivery 110, the flow of data packets of both connection paths 210, 220 goes through the respective internet protocol edge device 111, 112, as well as through a wide area network port 125.

Figure 5:
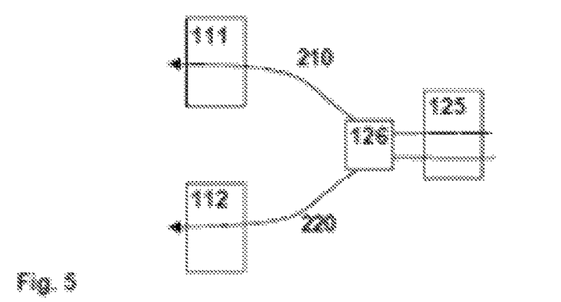
FIGS. 5 and 6 schematically show different load balancing schemes between the primary and secondary connection paths in downlink direction.
Figure 6:
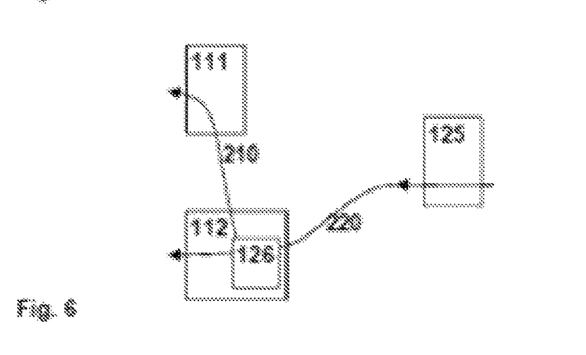

FIGS. 5 and 6 schematically illustrate different possibilities regarding handling of the downlink direction of both the primary and the secondary connection path 210, 220, especially highlighting different load balancing schemes between the primary and secondary connection paths 210, 220: In FIG. 5, an embodiment is shown where a load balancing functionality 126 is realized as a virtual network function independent from both the first internet protocol edge device 111 and the second internet protocol edge device 112. Data packets in downlink direction having (or using) the internet protocol address common to both the primary and secondary connection paths 210, 220 need to go through the load balancing functionality 126. According to an alternative embodiment of the present invention, shown in FIG. 6, the load balancing functionality 126 is realized as a functionality within (or as part of) the virtual network function of the second internet protocol edge device 112 (alternatively, the load balancing functionality 126 could also be realized within (or as part of) the virtual network function of the first internet protocol edge device 111). Again, data packets in downlink direction having (or using) the internet protocol address common to both the primary and secondary connection paths 210, 220 need to go through the load balancing functionality 126, i.e. in the example shown in FIG. 6, the first connection path 210 is commonly routed (with the second connection path 220) between the wide area network access port 125 and the load balancing functionality 126. According to still a further embodiment, the load balancing functionality 126 as well as both internet protocol edge devices 111, 112 could be integrated into one virtual network function within the logical or physical central office point of delivery 110.

According to the present invention, a common use case relates to bundling a fixed line connection and a cellular connection, especially an LTE connection. In a very common setup, on the LTE patch, the end device (or client devices 51, 52) connects to the base station entity 150 such as an eNodeB, and the base station entity tunnels the data packets using GTP (GPRS (General Packet Radio System) Tunneling Protocol) to the SGW (Serving Gateway). The SGW tunnels the data packets using another GTP-leg to the PGW (Packet Gateway). The PGW that is chosen depends on the APN (Access Point Name). According to the present invention, the PGW does act as internet protocol edge device 111, 112. On the fixed side, the end device (or client device 51, 52) attaches via cable or WiFi or WLAN to the home gateway (or customer premises equipment device 50) that sets up a PPPoE (Point to point protocol over Ethernet) tunnel to the BNG (Broadband Network Gateway). Similar to the PGW, the BNG acts as internet protocol edge device 111, 112. Using PPPoE is the most common example but IPoE (internet protocol over ethernet) is possible as well (cf. e.g., BBF TR-146).

According to the present invention, it is advantageously possible to realize a hybrid internet protocol connection via which it is possible to provide enhance quality-of-service parameters, especially enhanced bandwidth. However, other use cases include to be able to provide more redundancy (i.e. mole resiliency within the telecommunications network 100) and/or a faster time-to-market (as in the example where an LTE access is provided first (e.g. more or less immediately upon buying a subscription), and a fixed line access is provided once the physical connection is able to be established (e.g. after a home gateway device has be shipped to the user or customer).

Furthermore, it is especially preferred to realize the co-called CORD principle (Central Office Re-architected as a Data Center), wherein internet protocol edge devices 111, 112 or internet protocol edge functions/functionalities can become deployed in rather small data centers very close to the actual access nodes. CORD provides computing power to implement functions as well as a programmable switch back plane to interconnect between these functions and the upstream nodes.

In an embodiment using PPP (point to point protocol) and GTP (GPRS Tunneling Protocol), the PGW terminates the GTP tunnel that carriers the subscriber's traffic transmitted over LTE (e.g. the primary connection path 210) and the BNG carries the traffic transported over fixed line access (e.g. the secondary connection path 220, or vice versa). Especially, both functions run on commodity hardware servers inside the CORD central office point of delivery 110. The central office point of delivery 110 establishes Layer-2 connectivity between the nodes on the access side outside the central office point of delivery 110 and the VNFs inside the central office point of delivery 110. The hybrid (internet protocol) connection is set up as follows:
The home gateway (or customer premises equipment device 50) establishes a PPPoE connection to the BNG as (first) internet protocol edge device 111. PPPoE gets routed through the central office point of delivery 110 according to configurations dynamically provided. In case a load balancer functionality 126 is in place, the first internet protocol edge device 111 (BNG) needs to configure the load balancer (functionality) 126 to send downstream packets with this IP address to it. The home gateway or customer premises equipment device 50 gets assigned an IP address (or subnet) that can be used to access the internet/IP network on the wired area network side (WAN side). In addition, the home gateway (or customer premises equipment device 50) receives user credentials as well as the APN name (access point name) or related routing information to reach the second internet protocol edge device 112 (i.e. the PGW) co-located with the first internet protocol edge device 111 (i.e. the BNG) within the central office point of delivery 110. This information is made available before this step or created on-demand and will be stored in a local database of the central office point of delivery 110. The home gateway (or customer premises equipment device 50) connects to the LTE radio network and uses the credentials learned before (i.e. the path establishment information)—or those of a SIM card located within either the customer premises equipment device 50 or the client device 51, 52—to authenticate to the network. As APN, it provides the APN name learned during the fixed line network attachment. The SGW will thus be able to direct the GTP tunnel to the correct PGW using standard 3GPP mechanisms (e.g. DNS name resolution). In case a load balancer 126 is in place, the PGW needs to configure the load balancer to send downstream packets with this IP address to it.

Depending on network configuration, the APN name might not be sufficient to identify the exact instance of the PGW. In such a case, an additional field or the use of one of the existing fields in the tunnel setup messages comprises such additional information (being part of the path establishment information).

Upon reception of the GTP tunnel setup request, the PGW will derive information on the internet protocol address that is to be assigned to the home gateway (or customer premises equipment device 50) over the LTE path. The PGW will assign the same internet protocol address as the BNG previously did (for the primary connection path 210) to the home gateway 50.

The internet protocol address to be used for the secondary connection path 220 may be learned via one of the following procedures:
Query the database using any kind of token/information included during the attachment request of the home gateway/customer premises equipment device 50;
Learning the Token/internet protocol address combination via a push request from the BNG;
Validating an internet protocol address included in the attach request using the token or other additional parameters included in the tunnel setup messages.

Having performed these steps, the home gateway or customer premises equipment device 50 has received the same internet protocol address on both upstream interfaces. Thus, it is allowed to use this internet protocol address on both of them. Load balancing mechanisms inside the home gateway 50 may distribute the traffic. Separation of the access networks according to state of the art technology (separate networks, virtual networks using e.g. VLAN, MLPS or SDN is possible). Advantageously according to the present invention, there is no need for additional tunneling mechanisms such as e.g. GRE over IP as in some conventional deployments.

The first and second internet protocol edge devices 111, 112 both claim to give access to a device behind them (from the perspective of the telecommunications network 100) having the same internet protocol address. Hence, a mechanism to steer the traffic in downstream (or downlink) direction (i.e. from the telecommunications network 100 towards the home gateway or customer premises equipment device 50) is utilized. As—according to the present invention—all the concerned internet protocol addresses are assigned to the same logical or physical central office point of delivery 110 (and routing updates towards the wide area network, i.e. the telecommunications network 100, have assured this), the data packets will therefore reach the logical or physical central office point of delivery 110 at the WAN port 125.

One solution resides in realizing the load balancing functionality 126 (or load balancer) as a virtual network function (cf. FIG. 5): The BNG 111 instructs a load balancer virtual network function to act as central entry point for the incoming downlink traffic (from the wide area network port 125). While upstream (or uplink) traffic may bypass it, the downstream traffic needs to traverse this load balancing function 126. Upstream traffic is just being sent to the egress port. The flow rules in the backplane switching fabric of the logical or physical central office point of delivery 110 need to allow PGW 112 and BNG 111 to reach the wide area network port 125 via tunnels or—even easier—allow internet protocol packets with any source address to be injected to the fabric. On the reverse path (i.e. in downlink direction), the load balancer virtual network function 126 establishes tunnels to both internet protocol edge devices 111, 112 (virtual network functions) and the sends the packets according to the balancing logic across both connection paths 210, 220. The tunnels for each internet protocol address may to be provisioned at the load balancer once an internet protocol session is set up. As an alternative, they could also be statically pre-provisioned. Tunnels may be used per internet protocol address but can also be used per internet protocol edge (BNG/PGW) instance. The load balancer 126 acts as single point where the internet protocol address is anchored. The load balancer 126 might also be included in the upstream traffic path. By doing so, it may learn the load balancing applied by the home gateway device 50 based on e.g. inspecting 5-tuples of the internet protocol packets and automatically create the according downstream traffic load balancing rules. The home gateway may facilitate this by using a port re-write function.

According to an alternative solution, one internet protocol edge node takes over, i.e. the load balancer (or load balancing functionality 126) becomes embedded in one of the IP edge nodes 111, 112, either BNG or P-GW: This facilitates the routing inside the logical or physical central office point of delivery 110 since the internet protocol address is always anchored in the one of the internet protocol edge devices (such as, e.g., the BNG) hosting the load balancing functionality 126.

According to a further alternative, the load balancing functionality 126 is realized via the switch fabric: The load balancing policy or functionality is programmed in the switches themselves, and no load balancing virtual network function is needed any more. This solution utilizes flow rules that go beyond having a rule for super-nets. As an example, in the case of a BNG hosting an IP address 1.1.1.1 from the address pool 1.1.1.0/24, the forwarding table entry in the switching back plane would be only one since all addresses in the range could become covered by the address pool's /24 address. According to one embodiment of this solution, the load balancing rules are classified based on criteria that are programmed on the backplane such as, e.g., a source port range (for the two internet protocol edge devices 111, 112). The result thereof is that the FIB table entries simply double in size (when two internet protocol edge devices are used instead of only one). In an example, for downstream routes, the single edge "Dest 1.1.1.0/24→BNG" is replaced by a load balancing entries "Dest 1.1.1.0/24, dest port 0-32000→BNG" and "Dest 1.1.1.0/24, dest port 32000-64000→PGW". One possibility to achieve this is to require the home gateway 50 to intercept traversing TCP/UDP packets and to re-write the source ports in case they are random source ports and/or not well-known ones to either make packets traverse patch A or B (i.e. the first connection path 210 or the second connection path 220).

The IP address. This also works for IP networks in the same way.

Even though the present invention mainly focuses on using a central office point of delivery and its switching fabric, it is possible to implement the present invention also in a distributed system across multiple sites.

Further, for a redundant deployment, the IP edges may be located in physically as well as logically separated PODs. That would allow for redundancy e.g. on a per-rack level inside one location (two logical PODs) or even geographically. In that case, the load balancer that anchors the IP address or network needs to be taken out of the PODs. Note that per-rack separation is still feasible in case the switching backplane is shared. In that case, no load balancer is required.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing hybrid network connectivity to at least one client device being connected to a telecommunications network using a customer premises equipment device or functionality, wherein the hybrid network connectivity is provided using a hybrid internet protocol connection between at least two internet protocol edge devices, on the one hand, and the customer premises equipment device or functionality, on the other hand, allowing for transmission of data packets, both in an uplink direction from the customer premises equipment device or functionality to at least one of the internet protocol edge devices, and in a downlink direction from at least one of the internet protocol edge devices to the customer premises equipment device or functionality,
   wherein both a first internet protocol edge device and a second internet protocol edge device of the at least two internet protocol edge devices are realized as network functions within a logical or physical central office point of delivery,
   wherein the hybrid internet protocol connection comprises a primary connection path and at least one secondary connection path,
   wherein the method comprises the following steps:
   in a first step, the primary connection path is established between the first internet protocol edge device and the customer premises equipment device or functionality, the establishment of the primary connection path involving assignment of an internet protocol address to the hybrid internet protocol connection to be generated; and
   in a second step, subsequent to the first step, the at least one secondary connection path is established between the second internet protocol edge device and the customer premises equipment device or functionality, the at least one secondary connection path using the same internet protocol address as the primary connection path;
   wherein:
   regarding data packets transmitted in the downlink direction towards the customer premises equipment device or functionality, a load balancing functionality is used as a network function within the logical or physical central office point of delivery or as part of another network function within the logical or physical central office point of delivery; and
   during or after establishing the primary connection path, path establishment information is transmitted, using the primary connection path, from the first internet protocol edge device to the customer premises equipment device or functionality, wherein the path establishment information is used to find the second internet protocol edge device and to establish the at least one secondary connection path.

2. The method according to claim 1, wherein the at least one secondary connection path is established between the customer premises equipment device or functionality and the second internet protocol edge device, using the path establishment information;
   wherein the path establishment information comprises user credential information, a session token, access point name information, and/or access point name instance information.

3. The method according to claim 1, wherein:
   the primary connection path is a fixed line access connection and the first internet protocol edge device is a broadband network gateway, and the at least one secondary connection path is a mobile access connection and the second internet protocol edge device is a packet gateway; or the primary connection path is a mobile access connection and the first internet protocol edge device is a packet gateway, and the at least one secondary connection path is a fixed line access connection and the second internet protocol edge device is a broadband network gateway; or the primary connection path and the at least one secondary connection path are mobile access connections, and the first internet protocol edge device and the second internet protocol edge device are packet gateways; or the primary connection path and the at least one secondary connection paths are fixed line access connections, and the first internet protocol edge device and the second internet protocol edge device are is a broadband network gateways.

4. The method according to claim 1, wherein the internet protocol address, used by the customer premises equipment device or functionality with regard to both the primary connection path and the at least one secondary connection path, is validated at the internet protocol edge device or devices serving all connection paths beyond the primary connection path, using:
a database request using a token information towards an internet protocol address database;
a push request from the first internet protocol edge device; and/or
a token or other additional parameter included in tunnel setup messages.

5. The method according to claim 1, wherein—regarding data packets transmitted in the uplink direction from the customer premises equipment device or functionality—a further load balancing functionality is implemented in the customer premises equipment device or functionality.

6. The method according to claim 1, wherein the load balancing functionality, the first internet protocol edge device, and the second internet protocol edge device are realized as separate network functions within the logical or physical central office point of delivery.

7. The method according to claim 1, wherein the first internet protocol edge device and the second internet protocol edge device are realized as separate network functions within the logical or physical central office point of delivery, and wherein the load balancing functionality is realized as part of the network function of either the first or the second internet protocol edge device.

8. The method according to claim 1, wherein the load balancing functionality is realized by using—in addition to using the internet protocol address, or part thereof, used for the primary connection path and for the at least one secondary connection path—layer 4 port information indicating to use the primary connection path or a secondary connection path of the at least one secondary connection path, wherein the layer 4 port information is set by the customer premises equipment device or functionality during layer 4 session setup via re-writing corresponding source port header fields, enabling the load balancing functionality for packets towards the at least two internet protocol edge devices to route packets towards the at least two internet protocol edge devices based on pre-configured rules by looking up destination port information;
wherein the load balancing functionality is realized by configuring flow rules in switching network elements of a switching network that connect the at least two internet protocol edge devices with a wide area network, so as to implement load balancing based on layer 4 port ranges inside the switching network or by configuring the flow rules in a dedicated load balancer function.

9. The method according to claim 1, wherein the first internet protocol edge device, the second internet protocol edge device, and the load balancing functionality are realized in one integrated network function within the logical or physical central office point of delivery.

10. The method according to claim 1, wherein the internet protocol address used for both the primary connection path and the at least one secondary connection path corresponds to an IPv4 internet protocol address or to at least parts of an IPv6 internet protocol address.

11. A system for providing hybrid network connectivity to at least one client device being connected to a telecommunications network using a customer premises equipment device or functionality, wherein the system comprises:
the telecommunications network;
a logical or physical central office point of delivery; and
the customer premises equipment device or functionality;
wherein the hybrid network connectivity is provided using a hybrid internet protocol connection between at least two internet protocol edge devices, on the one hand, and the customer premises equipment device or functionality, on the other hand, allowing for transmission of data packets, both in an uplink direction from the customer premises equipment device or functionality to at least one of the internet protocol edge devices, and in a downlink direction from at least one of the internet protocol edge devices to the customer premises equipment device or functionality;
wherein both a first internet protocol edge device and a second internet protocol edge device of the at least two internet protocol edge devices are realized as network functions within the logical or physical central office point of delivery;
wherein the hybrid internet protocol connection comprises a primary connection path and at least one secondary connection path;
wherein the customer premises equipment device or functionality is configured for establishment of the primary connection path between the first internet protocol edge device and the customer premises equipment device or functionality, the establishment of the primary connection path involving assignment of an internet protocol address to the hybrid internet protocol connection to be generated;
wherein the customer premises equipment device or functionality is configured for establishment of the at least one secondary connection path between the second internet protocol edge device and the customer premises equipment device or functionality, the at least one secondary connection path using the same internet protocol address as the first connection path; and
wherein:
regarding data packets transmitted in the downlink direction towards the customer premises equipment device or functionality, a load balancing functionality is realized as a network function within the logical or physical central office point of delivery or as part of another network function within the logical or physical central office point of delivery; and
during or after establishing the primary connection path, path establishment information is transmitted, using the primary connection path, from the first internet protocol edge device to the customer premises equipment device or functionality, wherein the path establishment information is used to find the second internet protocol edge device and to establish the at least one secondary connection path.

12. One or more non-transitory computer-readable mediums having processor-executable instructions stored thereon for providing hybrid network connectivity to at least one client device being connected to a telecommunications network using a customer premises equipment device or functionality, wherein the hybrid network connectivity is provided using a hybrid internet protocol connection between at least two internet protocol edge devices, on the one hand, and the customer premises equipment device or functionality, on the other hand, allowing for transmission of data packets, both in an uplink direction from the customer premises equipment device or functionality to at least one of the internet protocol edge devices, and in a downlink direction from at least one of the internet protocol edge devices to the customer premises equipment device or functionality,     wherein both a first internet protocol edge device and a second internet protocol edge device of the at least two internet protocol edge devices are realized as network functions within a logical or physical central office point of delivery,     wherein the hybrid internet protocol connection comprises a primary connection path and at least one secondary connection path,     wherein the processor-executable instructions, when executed, facilitate performance of the following steps:

in a first step, the primary connection path is established between the first internet protocol edge device and the customer premises equipment device or functionality, the establishment of the primary connection path involving assignment of an internet protocol address to the hybrid internet protocol connection to be generated; and in a second step, subsequent to the first step, the at least one secondary connection path is established between the second internet protocol edge device and the customer premises equipment device or functionality, the at least one secondary connection path using the same internet protocol address as the primary connection path;

wherein:

regarding data packets transmitted in the downlink direction towards the customer premises equipment device or functionality, a load balancing functionality is used as a network function within the logical or physical central office point of delivery or as part of another network function within the logical or physical central office point of delivery; and     during or after establishing the primary connection path, path establishment information is transmitted, using the primary connection path, from the first internet protocol edge device to the customer premises equipment device or functionality, wherein the path establishment information is used to find the second internet protocol edge device and to establish the at least one secondary connection path.

\* \* \* \* \*